US012633242B2

(12) United States Patent
Kwon et al.

(10) Patent No.: US 12,633,242 B2
(45) Date of Patent: May 19, 2026

(54) COMPENSATION CIRCUIT AND DISPLAY DEVICE INCLUDING SAME

(71) Applicant: LG Display Co., Ltd., Seoul (KR)

(72) Inventors: Ki Tae Kwon, Paju-si (KR); Jong Wook Jang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/811,364

(22) Filed: Aug. 21, 2024

(65) Prior Publication Data

US 2025/0118239 A1 Apr. 10, 2025

(30) Foreign Application Priority Data

Oct. 5, 2023 (KR) ........................ 10-2023-0132392

(51) Int. Cl.
*G09G 3/20* (2006.01)
*G09G 3/3225* (2016.01)

(52) U.S. Cl.
CPC ......... *G09G 3/2007* (2013.01); *G09G 3/3225* (2013.01); *G09G 3/2096* (2013.01); *G09G 2320/0223* (2013.01); *G09G 2330/021* (2013.01); *G09G 2330/028* (2013.01)

(58) Field of Classification Search
CPC ............. G09G 23/2007; G09G 3/3225; G09G 3/3275; G09G 2330/021; G09G 3/2096; G09G 2320/0223; G09G 2330/028
See application file for complete search history.

(56) References Cited

U.S. PATENT DOCUMENTS

| | | | | |
|---|---|---|---|---|
| 9,837,018 | B2 | 12/2017 | Lee et al. | |
| 11,087,698 | B2 | 8/2021 | Lee et al. | |
| 2014/0168191 | A1* | 6/2014 | Byeon | G09G 3/3233 345/82 |
| 2016/0086542 | A1 | 3/2016 | Lee et al. | |
| 2021/0020093 | A1* | 1/2021 | Zhao | G09G 3/2003 |
| 2021/0043150 | A1 | 2/2021 | Lee et al. | |

FOREIGN PATENT DOCUMENTS

| | | | |
|---|---|---|---|
| KR | 10-2016-0036132 | A | 4/2016 |
| KR | 10-2020-0017112 | A | 2/2020 |
| KR | 10-2021-0017463 | A | 2/2021 |

* cited by examiner

*Primary Examiner* — Shaheda A Abdin
(74) *Attorney, Agent, or Firm* — Fenwick & West LLP

(57) ABSTRACT

A compensation circuit and a display device are disclosed. The compensation circuit includes a gain compensator that calculates a voltage drop amount using a first pixel driving voltage output from a power supply and a second pixel driving voltage fed back from a wire of a display panel. The voltage drop amount is amplified by a predetermined gain value. A first voltage compensator generates a high-potential gamma reference voltage by adjusting a first reference voltage using the voltage drop amount and a second voltage compensator generates a low potential gamma reference voltage by adjusting a second reference voltage using the generated voltage drop. The gain value is a value calculated using voltages at two predetermined points within the wire of the display panel. Accordingly, an individual compensation circuit optimized depending on a position where the pixel driving voltage is fed back can be provided.

17 Claims, 22 Drawing Sheets

| Ra (Ω) | 1 | 1 | 1 | 1 | 1 | 1 | 1 | 1 | 1 | 1 |
|---|---|---|---|---|---|---|---|---|---|---|
| Rb (Ω) | 1 | 1 | 1 | 1 | 1 | 1 | 1 | 1 | 1 | 1 |
| Rc (Ω) | 1 | 2 | 3 | 4 | 5 | 6 | 7 | 8 | 9 | 10 |
| V2 (V) | 8 | 9 | 9.6 | 10 | 10.28 | 10.5 | 10.66 | 10.8 | 10.90 | 11 |
| V3 (V) | 4 | 6 | 7.2 | 8 | 8.57 | 9 | 9.33 | 9.6 | 9.81 | 10 |
| Gain (V3 / V2) | 0.5 | 0.66 | 0.75 | 0.8 | 0.83 | 0.85 | 0.87 | 0.88 | 0.9 | 0.90 |

| Pattern | Conventional compensation circuit | | | |
|---|---|---|---|---|
| | 223G | 161G | 127G | 63G |
| White pattern | -0.77 | -2.41 | -3.27 | -5.44 |
| Black pattern | 2.20 | 1.05 | 0.64 | -0.09 |
| △ | 2.97 | 3.46 | 3.91 | 5.35 |

FIG. 7

| | | | | | | | | | | |
|---|---|---|---|---|---|---|---|---|---|---|
| Ra (Ω) | 1 | 1 | 1 | 1 | 1 | 1 | 1 | 1 | 1 | 1 |
| Rb (Ω) | 1 | 1 | 1 | 1 | 1 | 1 | 1 | 1 | 1 | 1 |
| Rc (Ω) | 1 | 2 | 3 | 4 | 5 | 6 | 7 | 8 | 9 | 10 |
| V1 (V) | 12 | 12 | 12 | 12 | 12 | 12 | 12 | 12 | 12 | 12 |
| V2 (V) | 8 | 9 | 9.6 | 10 | 10.28 | 10.5 | 10.66 | 10.8 | 10.90 | 11 |
| V3 (V) | 4 | 6 | 7.2 | 8 | 8.57 | 9 | 9.33 | 9.6 | 9.81 | 10 |
| Gain | 4 | 6 | 7.2 | 8 | 8.57 | 9 | 9.33 | 9.6 | 9.81 | 10 |

FIG. 10

| | | | | | | | | | | |
|---|---|---|---|---|---|---|---|---|---|---|
| Ra (Ω) | 1 | 1 | 1 | 1 | 1 | 1 | 1 | 1 | 1 | 1 |
| Rb (Ω) | 1 | 1 | 1 | 1 | 1 | 1 | 1 | 1 | 1 | 1 |
| Rc (Ω) | 1 | 2 | 3 | 4 | 5 | 6 | 7 | 8 | 9 | 10 |
| V1 (V) | 12 | 12 | 12 | 12 | 12 | 12 | 12 | 12 | 12 | 12 |
| V2 (V) | 4 | 6 | 7.2 | 8 | 8.57 | 9 | 9.33 | 9.6 | 9.81 | 10 |
| V3 (V) | 8 | 9 | 9.6 | 10 | 10.28 | 10.5 | 10.66 | 10.8 | 10.90 | 11 |
| Gain | 8 | 9 | 9.6 | 10 | 10.28 | 10.5 | 10.66 | 10.8 | 10.90 | 11 |

COMPENSATION CIRCUIT AND DISPLAY DEVICE INCLUDING SAME

CROSS-REFERENCE TO RELATED APPLICATION

This application claims priority to and the benefit of Republic of Korea Patent Application No. 10-2023-0132392, filed Oct. 5, 2023, which is hereby incorporated by reference in its entirety.

BACKGROUND

Field

The present disclosure relates to a compensation circuit and a display device including the same.

Description of Related Art

Electroluminescent display devices are divided into inorganic light emitting display devices and organic light emitting display devices according to a material of a light emitting layer. An active-matrix type organic light emitting display device includes an organic light emitting diode (hereinafter referred to as an "OLED") which emits light by itself, and has advantages in that a response speed is fast and luminous efficiency, luminance, and a viewing angle are large.

In organic light-emitting display devices, organic light-emitting diodes (referred to as "OLEDs") are formed in each of pixels. These organic light display devices not only respond quickly and have excellent light-emitting efficiency, luminance, and viewing angle, but also have excellent contrast ratio and color reproduction rate because they can express black tones as complete black.

To drive the pixels, a pixel driving voltage ELVDD is applied to the pixels. The pixel driving voltage ELVDD has a voltage drop depending on a load within a display panel. The compensation circuits use the pixel driving voltage fed back from an input end of the display panel to compensate for a gamma reference voltage so as to compensate for a voltage drop in the pixel driving voltage.

In this case, the pixels are variable resistors and a resistor of the wire applied with the pixel driving voltage is a fixed resistor. Therefore, when the resistance value of the pixel is changed depending on an image data, the voltage at a feedback position of the pixel driving voltage is also changed, making it difficult to accurately compensate for the voltage drop.

In addition, if the resistance value of the pixel is changed depending on the image data, a gain value, which is a resistance ratio of a differential amplifier, should vary depending on the image data, but the gain value is fixed. Therefore, when the gain value is fixed to match the image data for a specific gray level, there will inevitably be areas that are overcompensated or uncompensated in the image data for other gray levels.

SUMMARY

The present disclosure is directed to solving all the above-described necessity and problems.

The present disclosure provides a compensation circuit and a display device including the same.

It should be noted that objects of the present disclosure are not limited to the above-described objects, and other objects of the present disclosure will be apparent to those skilled in the art from the following descriptions.

In one embodiment, a compensation circuit comprises: a gain compensator circuit configured to calculate a voltage drop amount of a first pixel driving voltage that is output from a power supply onto a wire connected to the power supply and a display panel using the first pixel driving voltage output and a second pixel driving voltage fed back from the wire, the calculated voltage drop amount amplified by a gain value; a first voltage compensator configured to generate a high-potential gamma reference voltage by adjusting a first reference voltage using the calculated voltage drop amount; and a second voltage compensator configured to generate a low potential gamma reference voltage that is less than the high-potential gamma reference voltage by adjusting a second reference voltage using the calculated voltage drop amount, wherein the gain compensator circuit is configured to calculate the gain value using a first voltage at a first point of the wire and a second voltage at a second point of the wire that is spaced apart from the first point on the wire.

In one embodiment, a display device comprises: a display panel including a plurality of data lines, a plurality of gate lines, and pixels supplied with a first pixel driving voltage; a data driving circuit configured to supply pixel data to the plurality of data lines; a power supply configured to output the first pixel driving voltage; a wire that is connected to the power supply and the display panel, the first pixel driving voltage supplied on the wire; and a compensation circuit configured to calculate a voltage drop amount of the first pixel driving voltage using a first voltage at a first point on the wire and a second voltage at a second point on the wire that is different from the from the first point, wherein the calculated voltage drop amount is amplified by the compensation circuit using a gain value that matches the second voltage at the second point.

According to the present disclosure, voltages of at least two points in a wire of a display panel to which a pixel driving voltage is applied from a power supply can be used to derive mathematical equations for compensating for a voltage drop amount in the pixel driving voltage, and to implement a compensation circuit based on the derived mathematical equations so that an individual compensation circuit optimized depending on a position where the pixel driving voltage is fed back can be provided.

Since the present disclosure is capable of providing an optimized individual compensation circuit, the performance of compensating for the voltage drop of the pixel driving voltage can be maximized.

The present disclosure can reduce power consumption by maximizing the performance of compensating for the voltage drop of the pixel driving voltage.

The effects of the present specification are not limited to the above-mentioned effects, and other effects that are not mentioned will be apparently understood by those skilled in the art from the following description and the appended claims.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which:

FIGS. 6 to 8 are diagrams for explaining a compensation circuit according to a first embodiment;

FIGS. 9 to 11 are diagrams for explaining a compensation circuit according to a second embodiment;

DETAILED DESCRIPTION

Figure 1:
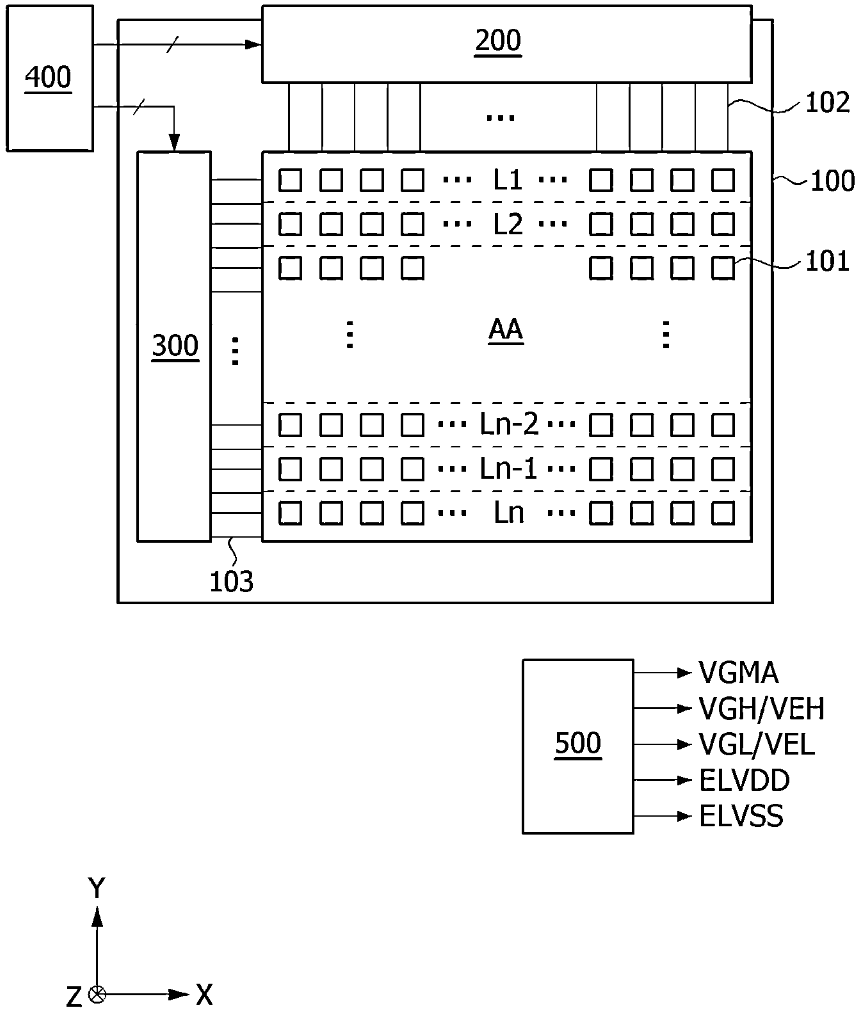
FIG. 1 is a block diagram illustrating a display device according to an embodiment of the present disclosure.

Advantages and features of the present specification and methods of achieving them will become apparent with reference to exemplary embodiments, which are described in detail, in conjunction with the accompanying drawings. However, the present specification is not limited to the embodiments to be described below and may be implemented in different forms, the embodiments are only provided to completely disclose the present disclosure and completely convey the scope of the present disclosure to those skilled in the art, and the present specification is defined by the disclosed claims.

Since the shapes, sizes, proportions, angles, numbers, and the like disclosed in the drawings for describing the embodiments of the present disclosure are only exemplary, the present disclosure is not limited to the illustrated items. The same reference numerals indicate the same components throughout the specification. Further, in describing the present disclosure, when it is determined that a detailed description of related known technology may unnecessarily obscure the gist of the present disclosure, the detailed description thereof will be omitted.

When ‘including,’ ‘having,’ ‘comprising,’ and the like mentioned in the present specification are used, other parts may be added unless ‘only’ is used. A case in which a component is expressed in a singular form includes a plural form unless explicitly stated otherwise.

In interpreting the components, it should be understood that an error range is included even when there is no separate explicit description.

In the case of a description of a positional relationship, for example, when the positional relationship of two parts is described as ‘on,’ ‘at an upper portion,’ ‘at a lower portion,’ ‘next to, and the like, one or more other parts may be located between the two parts unless ‘immediately’ or ‘directly’ is used.

Although first, second, and the like are used to describe various components, these components are not limited by these terms. These terms are only used to distinguish one component from another. Accordingly, a first component, which is mentioned, below may also be a second component within the technical spirit of the present disclosure.

The same reference numerals may refer to substantially the same elements throughout the present disclosure.

The following embodiments can be partially or entirely bonded to or combined with each other and can be linked and operated in technically various ways. The embodiments can be carried out independently of or in association with each other.

Hereinafter, various embodiments of the present disclosure will be described in detail with reference to the accompanying drawings.

In a display device of the present disclosure, the pixel circuit and the gate driving circuit may include a plurality of transistors. Transistors may be implemented as oxide thin film transistors (oxide TFTs) including an oxide semiconductor, low temperature polysilicon (LTPS) TFTs including low temperature polysilicon, or the like.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS), since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. The gate-on voltage is set to a voltage higher than a threshold voltage of a transistor, and the gate-off voltage is set to a voltage lower than the threshold voltage of the transistor.

The transistor is turned on in response to the gate-on voltage and is turned off in response to the gate-off voltage. In the case of the n-channel transistor, a gate-on voltage may be a gate high voltage, and a gate-off voltage may be a gate low voltage. In the case of the p-channel transistor, a gate-on voltage may be a gate low voltage, and a gate-off voltage may be a gate high voltage.

In the embodiment, voltages of two predetermined points, including a point at which the pixel driving voltage is fed back in the wire of the display panel to which the pixel driving voltage is applied from the power supply to the display panel, may be used to derive mathematical equations for compensating for a voltage drop amount in the pixel driving voltage and to implement a compensation circuit based on the derived mathematical equations.

Figure 2:
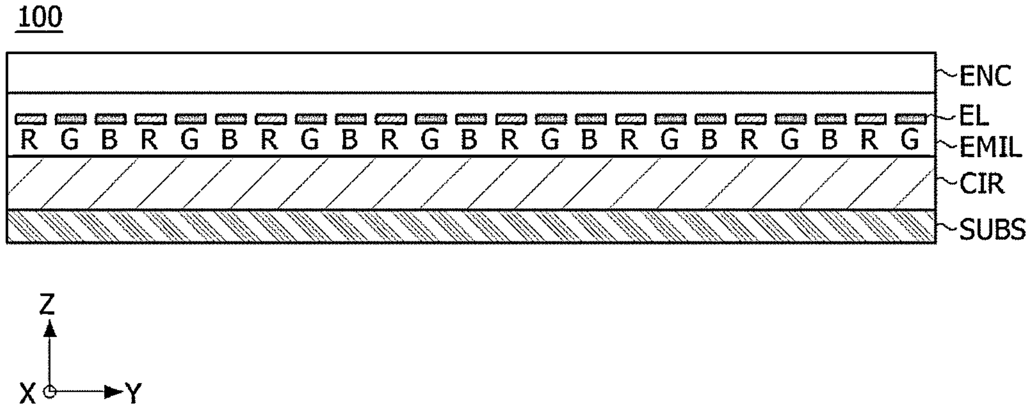
FIG. 2 is a diagram illustrating a cross-sectional structure of a display panel shown in FIG. 1 according to an embodiment of the present disclosure.

FIG. 1 is a block diagram illustrating a display device according to an embodiment of the present disclosure, and FIG. 2 is a diagram illustrating a cross-sectional structure of a display panel shown in FIG. 1 according to an embodiment of the present disclosure.

Referring to FIGS. 1 and 2, a display device according to an embodiment of the present disclosure includes a display panel 100, a display panel driving unit configured to write pixel data to pixels of the display panel 100, and a power supply unit 600 configured to generate power required for driving the pixels and the display panel driving unit.

The display panel 100 may be a panel with a rectangular-shaped structure having a length in an X-axis direction, a width in a Y-axis direction, and a thickness in a Z-axis direction. A display area AA of the display panel 100 includes a pixel array that displays an input image. The pixel array includes a plurality of data lines 102, a plurality of gate lines 103 intersecting the data lines 102, and pixels disposed in a matrix form. The display panel 100 may further include power lines commonly connected to the pixels. The power lines may be commonly connected to pixel circuits and may supply voltages required for driving pixels 101 to the pixels 101.

Each of the pixels 101 may be divided into a red sub-pixel, a green sub-pixel, and a blue sub-pixel for color implementation. Each of the pixels may further include a white sub-pixel. Each of the sub-pixels includes a pixel circuit for driving a light-emitting element. Each of the pixel circuits is connected to the data lines, the gate lines, and the power lines.

The pixel array includes a plurality of pixel lines L1 to Ln. Each of the pixel lines L1 to Ln includes one line of pixels disposed in a line direction or a length direction (the X-axis direction) of display panel in the pixel array of the display panel 100.

The display panel 100 may be implemented as a non-transmissive display panel or a transmissive display panel. The transmissive display panel is applicable to a transparent display device in which an image is displayed on a screen and a real background object is visible. The display panel may be manufactured as a flexible display panel.

The cross-sectional structure of the display panel 100 may include a circuit layer CIR, a light-emitting element layer EMIL, and an encapsulation layer ENC stacked on a substrate SUBS, as shown in FIG. 2.

The circuit layer CIR may include a thin-film transistor (TFT) array including a pixel circuit connected to wirings such as a data line, a gate line, a power line, and the like, and a gate driver 410 and 420. The circuit layer CIR includes a plurality of metal layers insulated with insulating layers interposed therebetween, and a semiconductor material layer. All transistors formed in the circuit layer CIR can be implemented as n-channel oxide TFTs.

The light-emitting element layer EMIL may include a light-emitting element driven by the pixel circuit. The light-emitting element may include a light-emitting element of a red sub-pixel, a light-emitting element of a green sub-pixel, and a light-emitting element of a blue sub-pixel. The light-emitting element layer EMIL may further include a light-emitting element of white sub-pixel. The light-emitting element layer EMIL corresponding to each of the sub-pixels may have a structure in which a light-emitting element and a color filter are stacked. The light-emitting elements EL in the light-emitting element layer EMIL may be covered by multiple protective layers including an organic film and an inorganic film.

The encapsulation layer ENC covers the light-emitting element layer EMIL to seal the circuit layer CIR and the light-emitting element layer EMIL. The encapsulation layer ENC may also have a multi-insulating film structure in which an organic film and an inorganic film are alternately stacked. The inorganic film blocks permeation of moisture and oxygen. The organic film planarizes the surface of the inorganic film. When the organic layer and the inorganic layer are stacked in multiple layers, the movement path of moisture and oxygen becomes longer than that of a single layer, so that penetration of moisture and oxygen affecting the light-emitting element layer EMIL may be effectively blocked.

A touch sensor layer (not shown) may be formed on the encapsulation layer ENC, and a polarizing plate or a color filter layer may be disposed thereon. The touch sensor layer may include capacitive touch sensors that sense a touch input based on a change in capacitance before and after the touch input. The touch sensor layer may have metal wiring patterns and insulating films that form the capacitance of the touch sensors. The insulating films may insulate an area where the metal wiring patterns intersect and may planarize the surface of the touch sensor layer. The polarizing plate may improve visibility and contrast ratio by converting the polarization of external light reflected by metal in the touch sensor layer and the circuit layer. The polarizing plate may be implemented as a circular polarizing plate or a polarizing plate in which a linear polarizing plate and a phase retardation film are bonded together. A cover glass may be adhered to the polarizing plate. The color filter layer may include red, green, and blue color filters. The color filter layer may further include a black matrix pattern. The color filter layer may replace the polarizing plate by absorbing a part of the wavelength of light reflected from the circuit layer and the touch sensor layer, and increase the color purity of an image reproduced in the pixel array.

The power supply unit 500 generates direct current (DC) power necessary to drive the display panel driving unit and the pixel array of the display panel 100 by using a DC-DC converter. The DC-DC converter may include a charge pump, a regulator, a buck converter, a boost converter, and the like. The power supply unit 600 may adjust a level of an input DC voltage applied from a host system (not shown) to generate constant voltages (or DC voltages) such as a gamma reference voltage VGMA, gate-on voltages VGH and VEH, gate-off voltages VGL and VEL, the pixel driving voltage ELVDD, the low-potential power voltage ELVSS, the initialization voltage Vinit, and the reference voltage Vref. The gamma reference voltage VGMA is supplied to a data driving unit 200. The gate-on voltages VGH and VEH and the gate-off voltages VGL and VEL are supplied to a gate driving unit 300. The constant voltages such as the pixel driving voltage ELVDD, the low-potential power voltage ELVSS, the initialization voltage Vinit, and the reference voltage Vref are commonly supplied to the pixels.

The display panel driving unit writes pixel data of an input image to the pixels of the display panel 100 under control of a timing controller (T-CON) 400.

The display panel driving unit includes the data driving unit 200 and the gate driving unit 300. The display panel driving unit includes the timing controller (T-CON) 400 that controls the data driving unit 200 and the gate driving unit 300.

The display panel driving unit may further include a touch sensor driving unit for driving the touch sensors. The touch sensor driving unit is omitted from the drawing. The data driving unit 200 and the touch sensor driving unit may be integrated into one integrated circuit (IC).

The data driving unit 200 generates a data voltage Vdata by converting pixel data of an input image received from the timing controller 400 with a gamma compensation voltage every frame period by using a digital to analog converter (DAC). The gamma reference voltage VGMA is divided for respective gray scales through a voltage divider circuit. The gamma compensation voltage divided from the gamma reference voltage VGMA is provided to the DAC of the data driving unit 200. The data voltage Vdata is outputted through the output buffer AMP in each of the channels of the data driving unit 200.

In the data driving unit 200, the output buffer AMP included in one channel may be connected to adjacent data lines 102 through the de-multiplexer array. The de-multiplexer array may be formed directly on the substrate of the display panel 100 or integrated into one drive IC together with the data driving unit 200.

The gate driving unit 300 may be implemented as a gate in panel (GIP) circuit formed directly on a bezel area of the display panel 100 together with the TFT array of the display area AA. The gate driving unit 300 sequentially outputs gate signals to the gate lines 103 under the control of the timing controller 400. The gate driving unit 300 may sequentially supply the gate signals to the gate lines 103 by shifting the gate signals using a shift register.

The timing controller 400 receives digital video data DATA of an input image and timing signals synchronized with the digital video data from the host system. The timing signals may include a vertical synchronization signal Vsync, a horizontal synchronization signal Hsync, a clock CLK, a data enable signal DE, and the like. The vertical synchronization signal Vsync and the horizontal synchronization signal Hsync may be omitted since a vertical period and a horizontal period may be obtained by a method of counting the data enable signal DE. The data enable signal DE has a period of one horizontal period 1H.

The host system may be one of a television system, a tablet computer, a notebook computer, a personal computer (PC), a home theater system, and a vehicle system. The host system may scale an image signal from a video source to match a resolution of the display panel 100 and transmit a resultant image signal and a timing signal to the timing controller 400.

The timing controller 400 transmits pixel data of an input image to the data driving unit 200. Based on the timing signals Vsync, Hsync, and DE received from the host system, the timing controller 400 generates a data timing control signal for controlling the operation timing of the data driving unit 200, and a gate timing control signal for controlling the operation timing of the gate driving unit 300. The timing controller 400 synchronizes the data driving unit 200 and the gate driving unit 300 by controlling the operation timings of the display panel driving circuit.

The gate timing control signal outputted from the timing controller 400 may be inputted to the gate driving unit 300 through a level shifter (not shown). The level shifter may receive the gate timing control signal, generate a start signal and a shift clock, and supply them to the gate driving unit 300.

Figure 3:
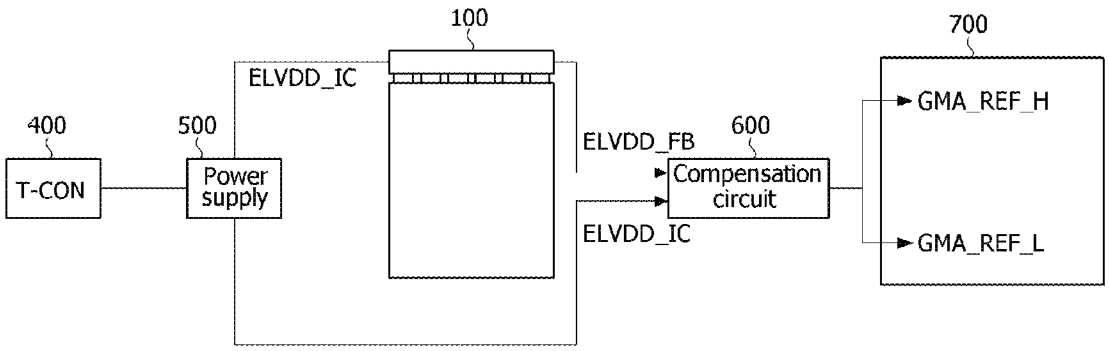
FIG. 3 is a diagram for explaining the operation of a compensation circuit according to an embodiment of the present disclosure.

FIG. 3 is a diagram for explaining the operation of a compensation circuit according to an embodiment of the present disclosure.

Referring to FIG. 3, a compensation circuit 600 according to an embodiment of the present disclosure may calculate a voltage drop amount using a pixel driving voltage ELVDD_IC applied from a power supply 500 and a pixel driving voltage ELVDD_FB fed back from a display panel 100, and adjust a gamma reference voltage using the calculated voltage drop amount to supply an adjusted gamma reference voltage to a gamma voltage generator 700.

The gamma voltage generator 700 may generate gamma voltages for each gray level using the adjusted gamma reference voltage, that is, a high-potential gamma reference voltage GMA_REF_H and a low-potential gamma reference voltage GMA_REF_L.

The compensation circuit 600 according to an embodiment may be implemented as a circuit that uses voltages of at least two points in a wire to which a pixel driving voltage is applied to derive mathematical equations for compensating for the voltage drop amount in the pixel driving voltage, and is designed based on the derived mathematical equations.

FIGS. 4A to 4E are diagrams for explaining problems with existing compensation circuits.

Figure 4A:
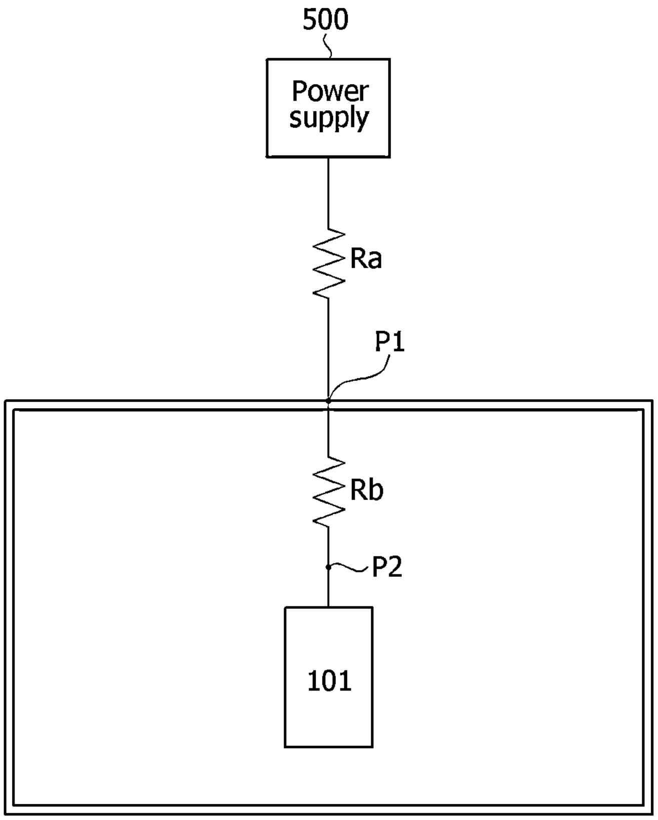
FIGS. 4A to 4F are diagrams for explaining problems with existing compensation circuits.

Referring to FIG. 4A, two points in the wire applied with the pixel driving voltage may include a first point P1 at which the pixel driving voltage is fed back and a second point P2 for calculating the voltage drop amount. For example, the first point P1 may be a position where the pixel driving voltage is fed back, and the second point P2 may be a position at which a voltage for compensating for the pixel driving voltage that is fed back is measured.

Here, although the first point P1 is located closer to the power supply 500 than the second point P2, but it is not necessarily limited to thereto, and the second point P2 may be closer than the first point P1.

Figure 4B:
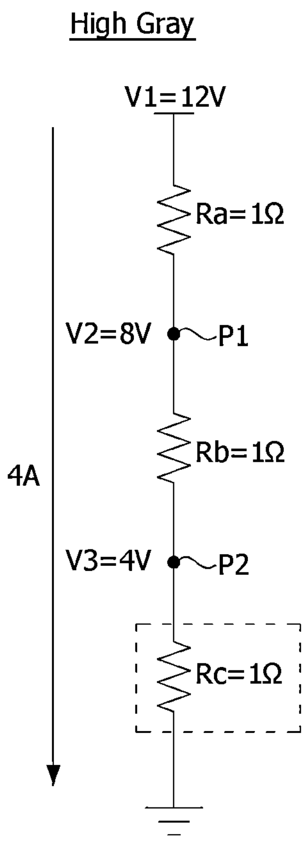
Figure 4C:
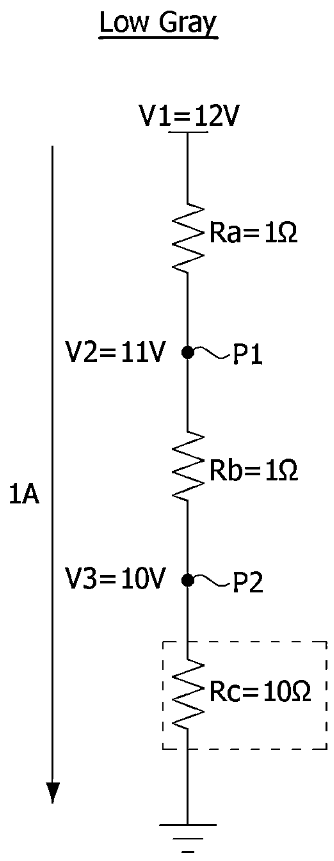

When the pixel is referred to as a variable resistor and the resistor on the wire is referred to a fixed resistor, it may be represented as an equivalent circuit as shown in FIGS. 4A and 4C, where the resistance value is changed depending on the gray level.

Referring to FIG. 4B, it shows an equivalent circuit in which a resistance value is changed depending on a high gray level, and when the resistance value is changed depending on an image data, the voltages at the first point P1 and the second point P2 are also changed. For example, if the pixel driving voltage is ELVDD=12V and the resistance values Ra, Rb, and Rc of the wire in the display panel and the pixel are all 122, the current flowing in the wire in the display panel is I=4 A so that the voltage at the first point P1 is 8V, and the voltage at the second point P2 is 4V.

Referring to FIG. 4C, it shows an equivalent circuit in which a resistance value is changed depending on a low gray level, and when the resistance value is changed depending on to an image data, the voltages at the first point P1 and the second point P2 are also changed. For example, if the pixel driving voltage is ELVDD=12V, the resistance values Ra and Rb of the wire in the display panel are 1Ω, and the resistance value Rc of the pixel is 10Ω, the current flowing in the wire in the display panel is I=1 A so that the voltage at point P1 is 11V, and the voltage at second point P2 is 10V.

Figures 4D, 4E:
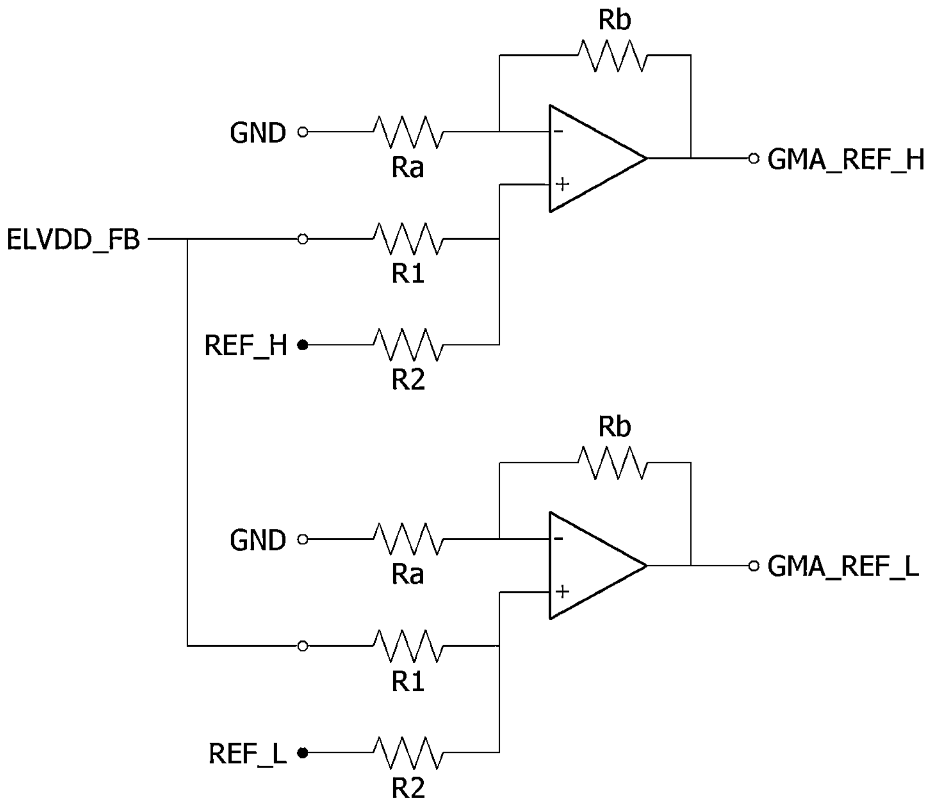

Referring to FIG. 4D, it may be seen that when the resistance value of the pixel is changed depending on the gray level, the voltage at the first point P1 and the second point P2 are changed. In order to compensate for the voltage at the second point P2, different gain values should be applied to the voltage at the first point P1 depending on the gray level.

Referring to FIG. 4E, in the conventional compensation circuits, the gain values are fixed to the ratio (Ra/Rb) of the resistance values. Therefore, with the conventional compensation circuits, it is not possible to apply different gain values depending on the gray level.

In addition, since it is not possible to apply different gain values, there will inevitably be areas that are overcompensated or undercompensated when the gain values are fixed to specific gray levels.

Figure 4F:
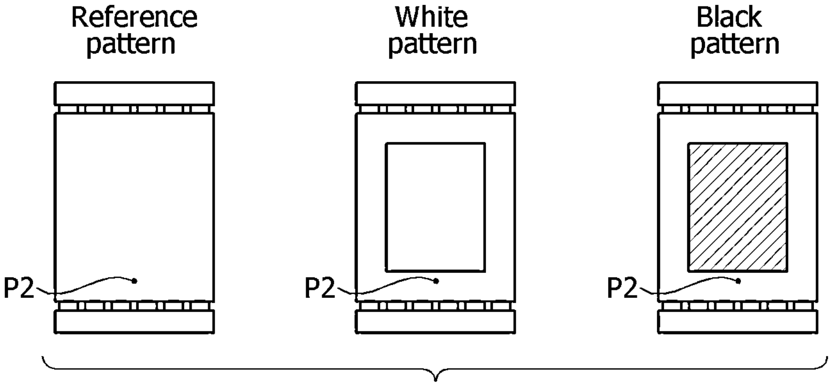

Referring to FIG. 4F, it shows the results of measuring a luminance change rate depending on gray levels. When the same gain value is applied to the conventional compensation circuit shown in FIG. 4E, the luminance at the second point decreases because the voltage drop amount is increased in the white pattern, and the luminance at the second point increases because the voltage drop amount is decreased in the black pattern.

Since the voltage drop due to the resistor at the input end of the display panel is compensated by the compensation circuit, it may be seen that the luminance should be constant in areas other than a specific pattern, but the compensation rate is low. The deviation in the rate of the luminance change tends to increase from a high gray level to a low gray level.

Therefore, the compensation circuit according to an embodiment may be implemented as a circuit that uses voltages of at least two points in a wire to which a pixel driving voltage is applied to derive mathematical expressions for compensating for the voltage drop amount in the pixel driving voltage, and is designed based on the derived mathematical expressions.

Figure 5:
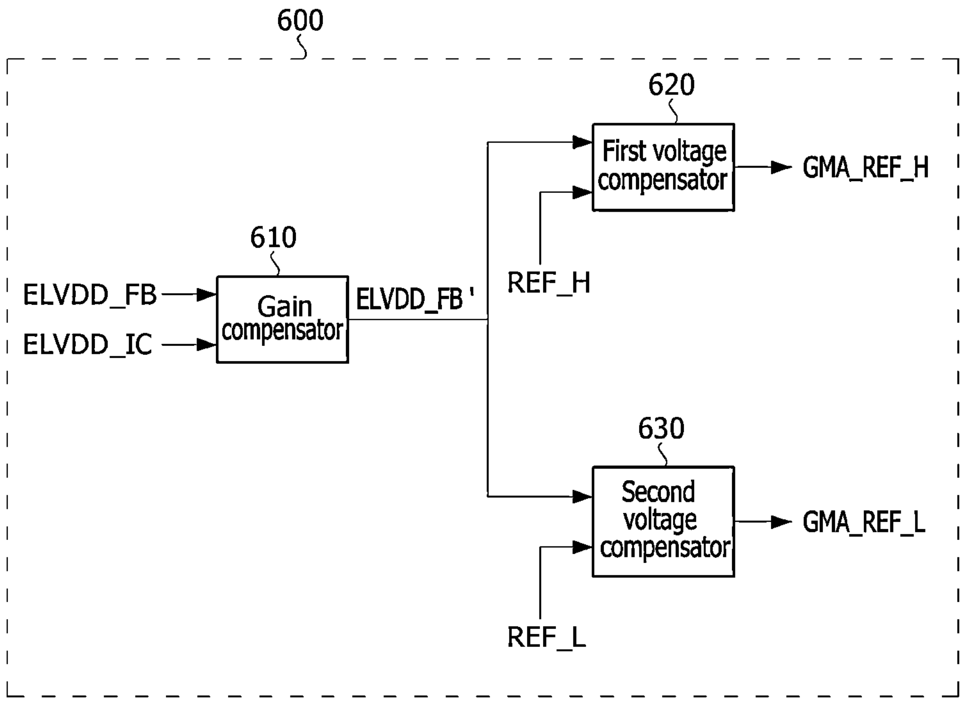
FIG. 5 is a diagram illustrating the detailed configuration of a compensation circuit according to an embodiment of the present disclosure.

FIG. 5 is a diagram illustrating the detailed configuration of a compensation circuit according to an embodiment of the present disclosure.

Referring to FIG. 5, the compensation circuit 600 according to an embodiment of the present disclosure may include a gain compensator 610 (e.g., a circuit), a first voltage compensator 620 (e.g., a circuit), and a second voltage compensator 630 (e.g., a circuit).

The gain compensator 610 may generate the voltage drop amount ELVDD_FB' using a pixel driving voltage ELVDD_IC applied from a power supply and a pixel driving voltage ELVDD_FB fed back from the display panel, wherein the voltage drop amount ELVDD_FB' may be amplified by a predetermined gain value.

The first voltage compensator 620 may adjust a first reference voltage REF_H using the voltage drop amount ELVDD_FB' generated by the gain compensator 610 so as to generate an adjusted high potential gamma reference voltage GMA_REF_H.

The second voltage compensator 630 may adjust a second reference voltage REF_L using the voltage drop amount ELVDD_FB' generated by the gain compensator 610 so as to generate an adjusted low potential gamma reference voltage GMA_REF_L. In one embodiment, the second reference voltage REF_L is less than the first reference voltage REF_H and the adjusted low potential gamma reference voltage GMA_REF_L is less than the adjusted high potential gamma reference voltage GMA_REF_H.

Figure 6:
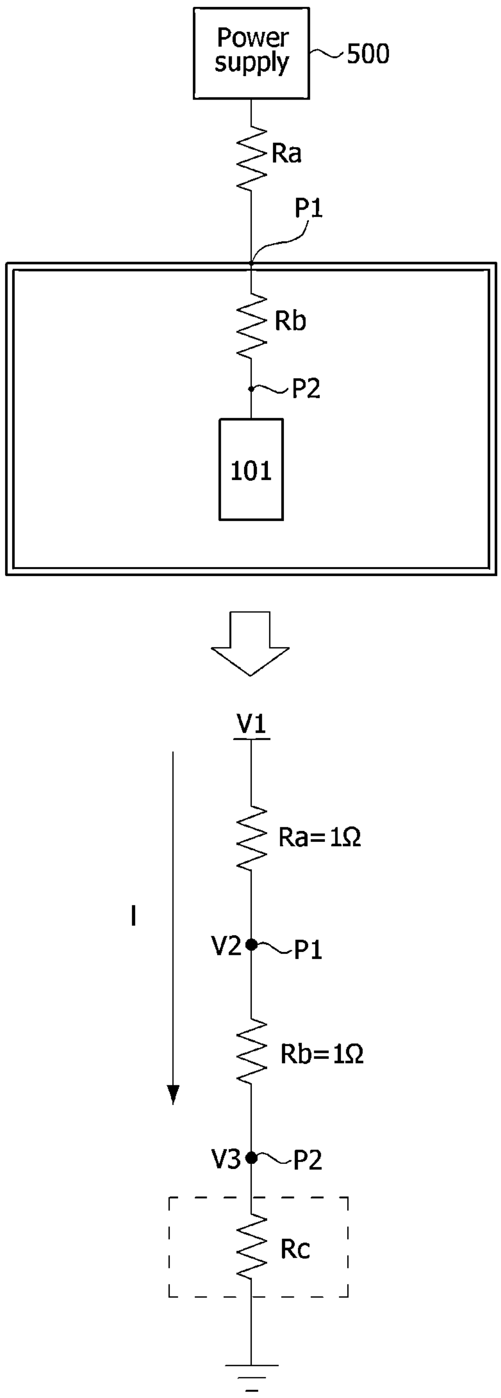
Figure 8:
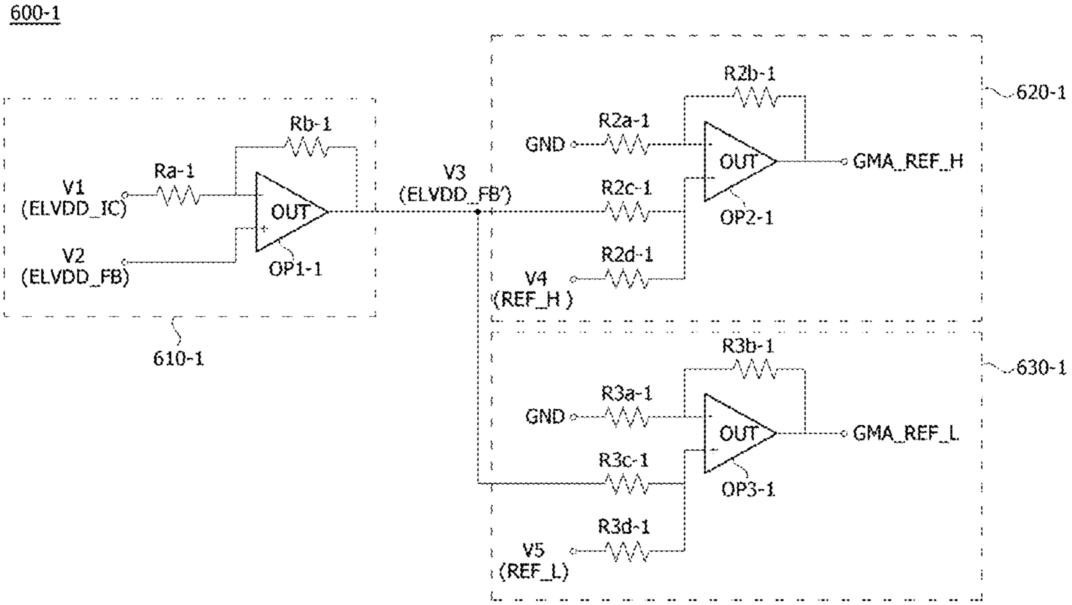

FIGS. 6 to 8 are diagrams for explaining a compensation circuit according to a first embodiment.

Referring to FIGS. 6 to 8, an equivalent circuit is shown for a path of the pixel driving voltage when the resistance to a first point P1 in the wire applied with the pixel drive voltage according to the first embodiment is lower than the resistance to a second point P2 that is spaced apart from point P1. As shown in FIG. 6, the second point P2 is a point in the display panel prior to the pixels 101 such that the first point P1 is closer to the power supply 500 than the second point P2.

Since the resistance value of the input end of the display panel at point P1 and the internal wire resistance value at point p2 are fixed values, and the resistance value within the pixel is a variable value depending on the pattern of the image data, the gain values are different. However, since the current flowing through the resistor of the input end point P1 and the current flowing through the resistor of the internal wire at point P2 are always constant, the ratio of the voltage difference between the two ends of each resistor is also always the same. Therefore, it is possible to calculate the voltage of the second point P2 using the ratio of the resistance of the input end to the resistance of the internal wire and the voltage of the first point.

The voltage $V_3$ measured at the second point P2 may be defined as the mathematical expression 1 below.

$$V_3 = V_1 - (V_1 - V_2)\times\left(1+\frac{b}{a}\right) = -\frac{b}{a}\times V_1 + \left(1+\frac{b}{a}\right)\times V_2 \quad \text{[Equation 1]}$$

Here, $V_1$ is a pixel driving voltage applied from a power supply, $V_2$ is a pixel driving voltage fed back from an input end of the display panel, a is the resistance value Ra of the input end of the display panel and b is a resistance value Rb of the internal wire. Here, the resistance value Rc of the pixel is excluded because any value does not affect the expression 1 above, which is a voltage relationship between the first point and the second point.

As shown in FIG. 7, it may be seen that the voltage actually measured at the second point is the same as the voltage calculated by Equation 1. That is, the value of the gain matches the voltage V3 at point P2. In other words, it may be seen that the value calculated by Equation 1 is accurate.

Therefore, in the embodiment, when the resistance to the first point is lower than the resistance to the second point, the gain compensator is designed to compensate for a feedback voltage using Equation 1 above.

As shown in FIG. 8, a compensation circuit 600-1 according to the first embodiment may include a gain compensator 610-1, a first voltage compensator 620-1, and a second voltage compensator 630-1.

The gain compensator 610-1 may include a first amplifier circuit implemented by Equation 1. The first amplifier circuit may include a first operational amplifier OP1-1, a first resistor Ra-1 connected to the inverting input terminal (−) of the first operational amplifier OP1-1 and to which the pixel driving voltage $V_1$ output from the power supply is applied, and a second resistor Rb-1 connected between an output terminal OUT and an inverting input terminal (−) of the first operational amplifier OP1-1.

The pixel driving voltage $V_2$ fed back from the second point P2 is applied to a non-inverting input terminal (+) of the first operational amplifier OP1-1, the pixel driving voltage $V_1$ applied from the power supply is applied to the inverting input terminal (−) of the first operational amplifier OP1-1, and a voltage compensated for the pixel driving voltage that is fed back by the gain value is output from the output terminal OUT of the first operational amplifier OP1-1.

The voltage $V_3$ output from the output terminal OUT of the first operational amplifier OP1-1 is expressed by Equation 1.

The first voltage compensator 620-1 may use the voltage $V_3$ output from the gain compensator 610-1 to adjust the first reference voltage REF_H (for example, $V_4$ in FIG. 8) so as to generate a high potential gamma reference voltage GMA_REF_H.

The generated high potential gamma reference voltage GMA_REF_H is expressed by Equation 2 below.

$$\text{GMA\_REF\_H} = 2\times\left(\frac{1}{2}V_3 + \frac{1}{2}V_4\right) \quad \text{[Equation 2]}$$

The first voltage compensator 620-1 may include a second amplifier circuit. The second amplifier circuit may include a second operational amplifier OP2-1, a first resistor R2*a*-1 connected between the inverting input terminal (−) of the second operational amplifier OP2-1 and the ground GND, a second resistor R2*b*-1 connected between the output terminal OUT and the inverting input terminal (−) of the operational amplifier OP2-1, a third resistor R2*c*-1 connected to the non-inverting input terminal (+) of the second operational amplifier OP2-1 and to which the voltage output from the first operational amplifier OP1-1 is applied, and a fourth resistor R2*d*-1 connected to the non-inverting input terminal (+) of the second operational amplifier OP2-1 and to which the first reference voltage REF_H is applied.

For example, the first resistor R2*a*-1, the second resistor R2*b*-1, the third resistor R2*c*-1, and the fourth resistor R2*d*-1 may have the same resistance value, but are not necessarily limited thereto and may be different.

The second voltage compensator 630-1 may use the voltage $V_3$ output from the gain compensator 610-1 to adjust the second reference voltage REF_L (for example, $V_5$ in FIG. 8) so as to generate a low potential gamma reference voltage GMA_REF_L.

The generated low potential gamma reference voltage GMA_REF_L is expressed by Equation 3 below.

$$\text{GMA\_REF\_H} = 2\times\left(\frac{1}{2}V_3 + \frac{1}{2}V_4\right) \quad \text{[Equation 3]}$$

The second voltage compensator 630-1 may include a third amplifier circuit. The third amplifier circuit may include a third operational amplifier OP3-1, a first resistor R3*a*-1 connected between the inverting input terminal (−) of the third operational amplifier OP3-1 and the ground GND, a second resistor R3*b*-1 connected between the output terminal OUT and the inverting input terminal (−) of the operational amplifier OP3-1, a third resistor R3*c*-1 connected to the non-inverting input terminal (+) of the third operational amplifier OP3-1 and to which the voltage output from the first operational amplifier OP1-1 is applied, and a fourth resistor R3*d*-1 connected to the non-inverting input terminal (+) of the third operational amplifier OP3-1 and to which the second reference voltage REF_L is applied.

For example, the first resistor R3*a*-1, the second resistor R3*b*-1, the third resistor R3*c*-1, and the fourth resistor R3*d*-1 may have the same resistance value, but are not necessarily limited thereto and may be different.

Figure 9:
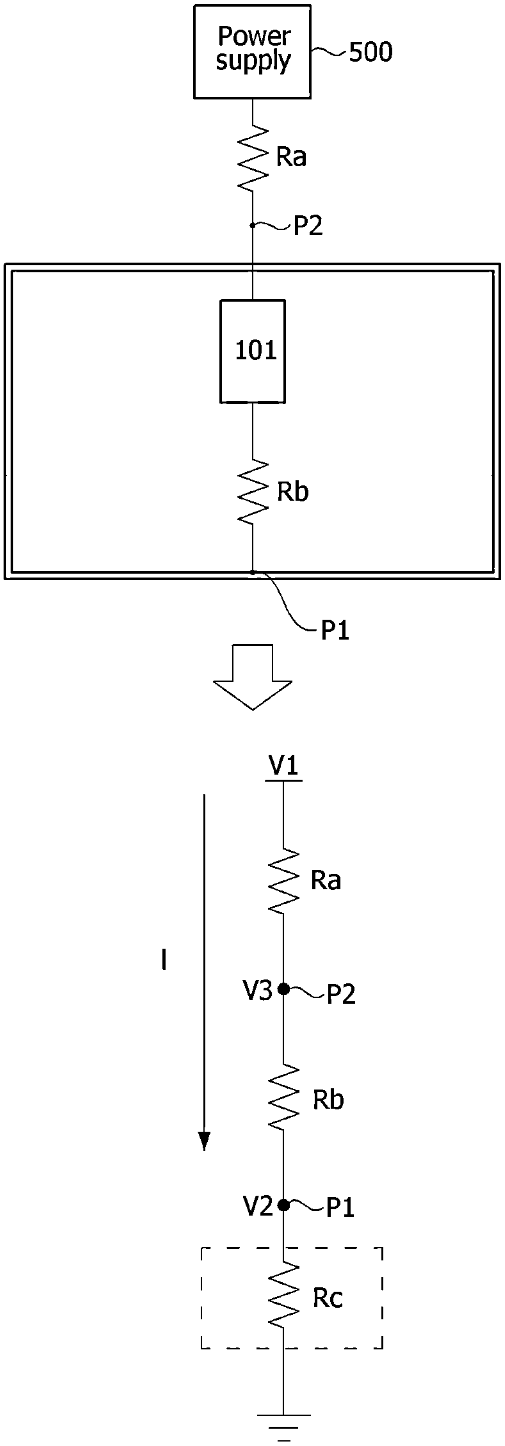
Figure 11:
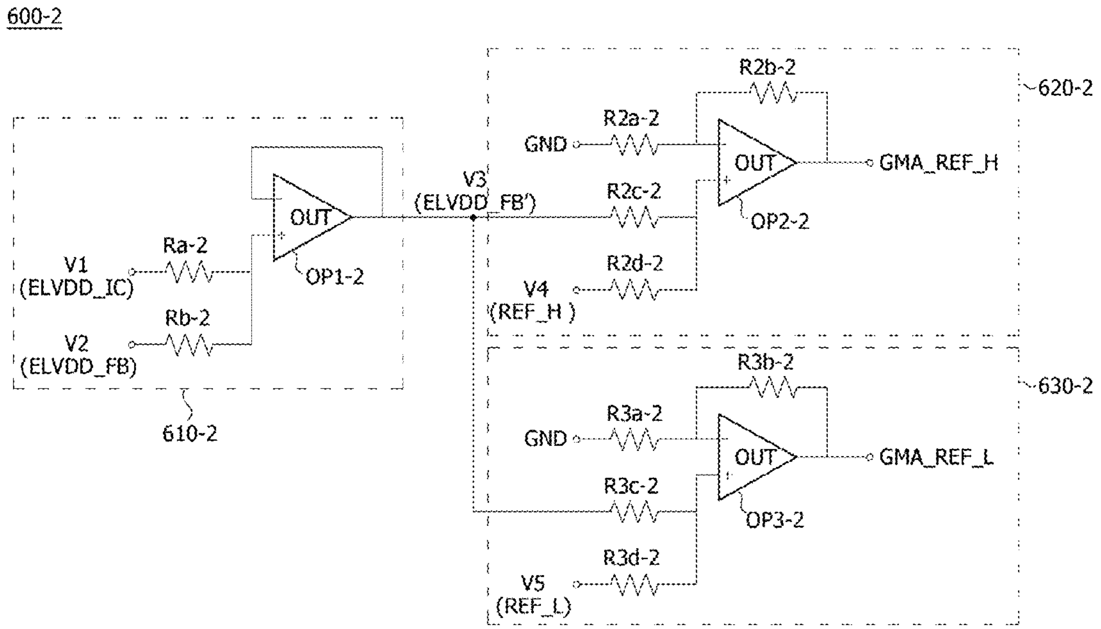

FIGS. 9 to 11 are diagrams for explaining a compensation circuit according to a second embodiment.

Referring to FIGS. 9 to 11, an equivalent circuit is shown for a path of the pixel driving voltage when the resistance to a first point in the wire applied with the pixel drive voltage according to the second embodiment is higher than the resistance to a second point. In FIGS. 9 to 11, the first point may be a position in the display panel after the pixels 101 and the second point P2 may be a location closer to the power supply 500 than the first point. For example, the second point P2 may be outside of the display panel.

The voltage $V_2$ measured at the second point P2 may be defined by Equation 4 below.

$$V_2 = (V_1 - V_3)\times\frac{b}{a+b} + V_3 = \frac{b}{a+b}\times V_1 + \frac{a}{a+b}\times V_3 \quad \text{[Equation 4]}$$

Here, the resistance value Rc of the pixel is excluded because any value or position does not affect the expression 4 above, which is a voltage relationship between the first point and the second point.

As shown in FIG. 10, it may be seen that the voltage actually measured at the second point P2 is the same as the voltage calculated by Equation 4. That is, the value of the gain matches the voltage V3 at point P2. In other words, it may be seen that the value calculated by Equation 4 is accurate.

Therefore, in the embodiment, when the resistance to the first point is higher than the resistance to the second point, the gain compensator is designed to compensate for a feedback voltage using Equation 4 above.

As shown in FIG. 11, a compensation circuit 600-2 according to the second embodiment may include a gain compensator 610-2, a first voltage compensator 620-2, and a second voltage compensator 630-2.

The gain compensator 610-2 may include a first amplifier circuit implemented by Equation 4. The first amplifier circuit may include a first operational amplifier OP1-2, a first resistor Ra-2 connected to the non-inverting input terminal (+) of the first operational amplifier OP1-2 and to which the voltage output from the power supply is applied, and a second resistor Rb-2 connected to the non-inverting input terminal (+) of the first operational amplifier OP1-2 and to which the pixel driving voltage $V_2$ fed back at the second point P2 is applied. The inverting input terminal (−) of the first operational amplifier OP1-2 may be connected to the output terminal OUT.

The first voltage compensator 620-2 may use the voltage $V_3$ output from the gain compensator 610-2 to adjust the first reference voltage REF_H so as to generate a high potential gamma reference voltage GMA_REF_H.

The first voltage compensator 620-2 may include a second amplifier circuit. The second amplifier circuit may include a second operational amplifier OP2-2, a first resistor R2*a*-2 connected between the inverting input terminal (−) of the second operational amplifier OP2-2 and the ground GND, a second resistor R2*b*-2 connected between the output terminal OUT and the inverting input terminal (−) of the operational amplifier OP2-2, a third resistor R2*c*-2 connected to the non-inverting input terminal (+) of the second operational amplifier OP2-2 and to which the voltage output from the first operational amplifier OP1-2 is applied, and a fourth resistor R2*d*-2 connected to the non-inverting input terminal (+) of the second operational amplifier OP2-2 and to which the first reference voltage REF_H is applied.

For example, the first resistor R2*a*-2, the second resistor R2*b*-2, the third resistor R2*c*-2, and the fourth resistor R2*d*-2 may have the same resistance value, but are not necessarily limited thereto and may be different.

The second voltage compensator 630-2 may use the voltage $V_3$ output from the gain compensator 610-2 to adjust the second reference voltage REF_L so that a low potential gamma reference voltage GMA_REF_L may be generated.

The second voltage compensator 630-2 may include a third amplifier circuit. The third amplifier circuit may include a third operational amplifier OP3-2, a first resistor R3*a*-2 connected between the inverting input terminal (−) of the third operational amplifier OP3-2 and the ground GND, a second resistor R3*b*-2 connected between the output terminal OUT and the inverting input terminal (−) of the operational amplifier OP3-2, a third resistor R3*c*-2 connected to the non-inverting input terminal (+) of the third operational amplifier OP3-2 and to which the voltage output from the first operational amplifier OP1-2 is applied, and a fourth resistor R3*d*-2 connected to the non-inverting input terminal (+) of the third operational amplifier OP3-2 and to which the second reference voltage REF_L is applied.

For example, the first resistor R3*a*-2, the second resistor R3*b*-2, the third resistor R3*c*-2, and the fourth resistor R3*d*-2 may have the same resistance value, but are not necessarily limited thereto and may be different.

Figure 12:
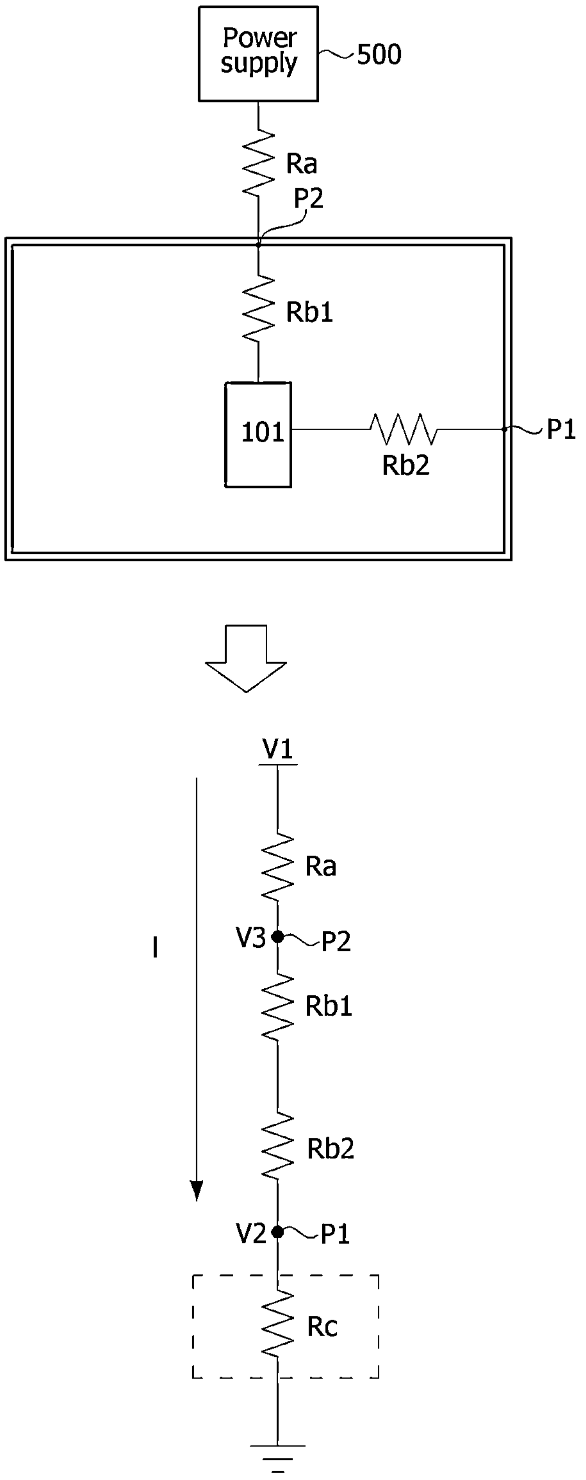
FIG. 12 is a diagram for explaining a compensation circuit according to a third embodiment.

FIG. 12 is a diagram for explaining a compensation circuit according to a third embodiment.

Referring to FIG. 12, an equivalent circuit is shown for a path of the pixel driving voltage when the resistance to a first point in the wire applied with the pixel drive voltage according to the third embodiment is higher than the resistance to a second point.

The voltage $V_3$ measured at the second point P2 may be defined by Equation 5 below.

$$V_2 = \frac{b_1 + b_2}{a + (b_1 + b_2)} \times V_1 + \frac{a}{a + (b_1 + b_2)} \times V_3 \quad \text{[Equation 5]}$$

Here, $b_1$ and $b_2$ are resistance values Rb1 and Rb2 of the internal wire respectively, and when $b_1$+$b_2$ are substituted by b, it becomes the same as Equation 4 above. Therefore, the compensation circuit according to the third embodiment is the same as the compensation circuit of FIG. 11 implemented by Equation 4 above. Here, the resistance value Rc of the pixel is excluded because any value or position does not affect the expression 5 above, which is a voltage relationship between the first point and the second point.

Figure 13:
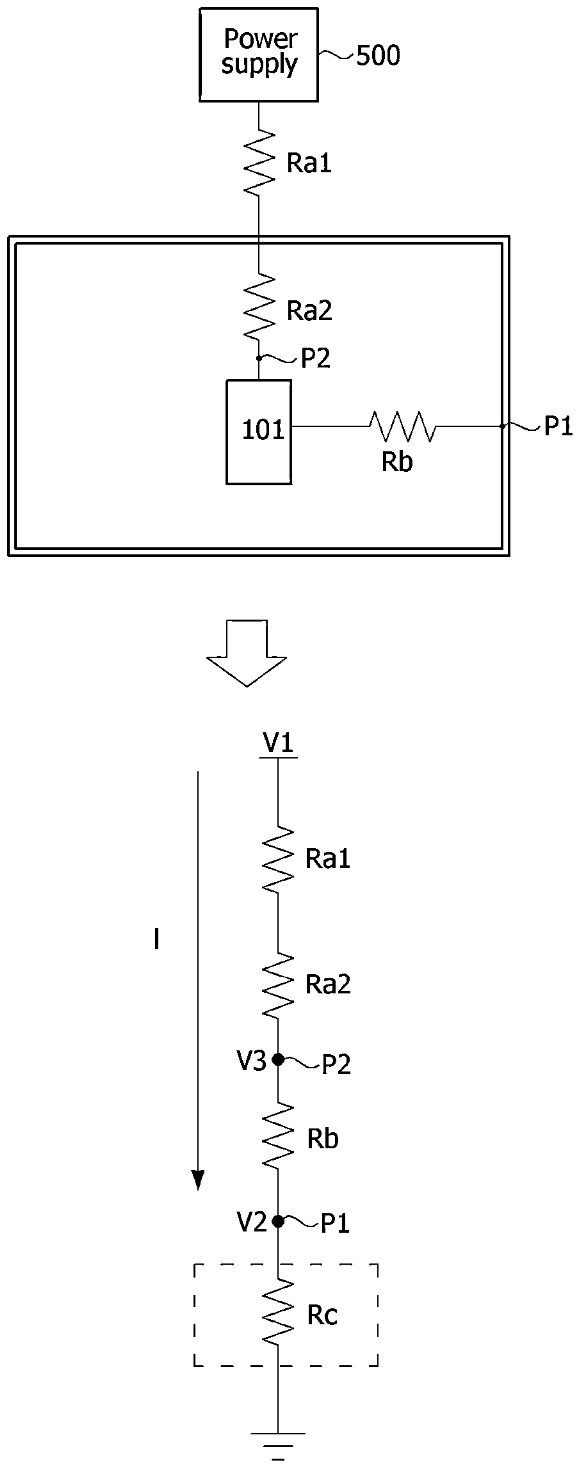
FIG. 13 is a diagram for explaining a compensation circuit according to a fourth embodiment.

FIG. 13 is a diagram for explaining a compensation circuit according to a fourth embodiment.

Referring to FIG. 13, an equivalent circuit is shown for a path of the pixel driving voltage when the resistance to a first point in the wire applied with the pixel drive voltage according to the fourth embodiment is higher than the resistance to a second point.

The voltage $V_2$ measured at the second point P2 may be defined by Equation 6 below.

$$V_2 = \frac{b}{(a_1 + a_2) + b} \times V_1 + \frac{a_1 + a_2}{(a_1 + a_2) + b} \times V_3 \quad \text{[Equation 6]}$$

Here, $a_1$ and $b_2$ are resistance values Ra1, Ra2 of the input end respectively, and when a1+a2 are substituted by a, it becomes the same as Equation 4 above. Therefore, the compensation circuit according to the fourth embodiment is the same as the compensation circuit of FIG. 11 implemented by Equation 4 above. Here, the resistance value Rc of the pixel is excluded because any value or position does not affect the expression 6 above, which is a voltage relationship between the first point and the second point.

Figure 14:
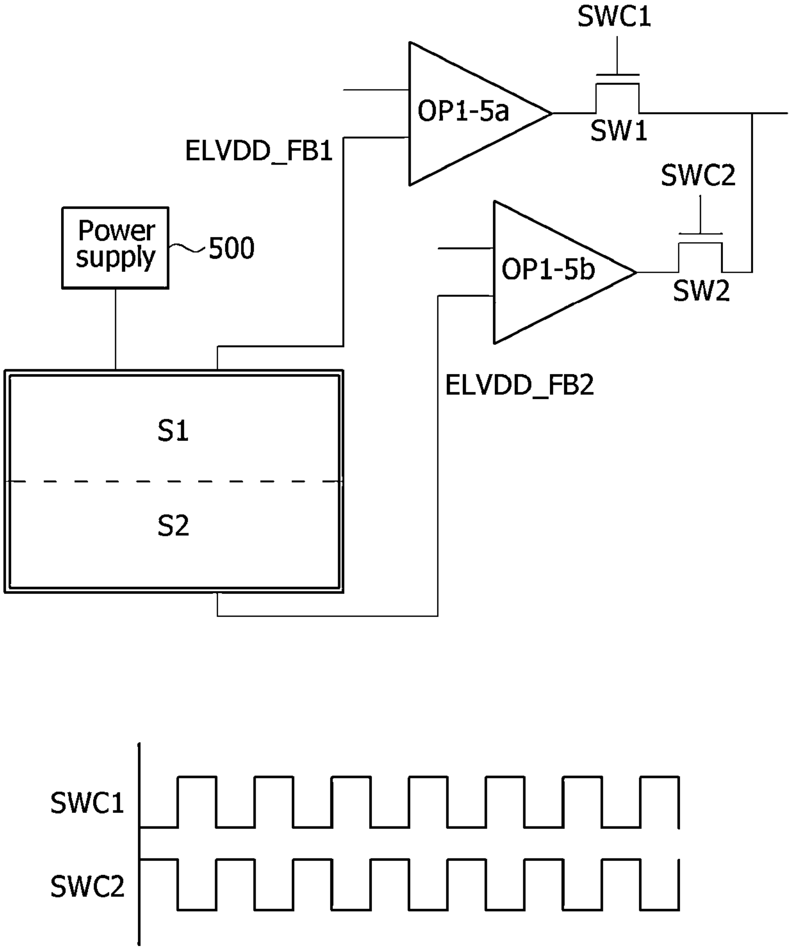
FIGS. 14 and 15 are diagrams for explaining a compensation circuit according to a fifth embodiment.
Figure 15:
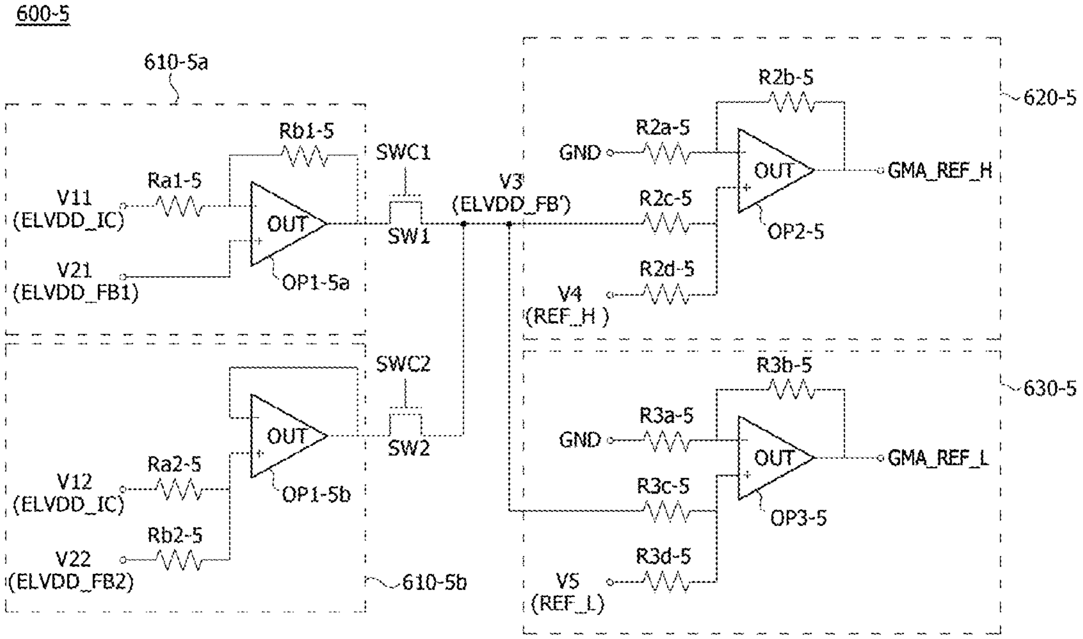

FIGS. 14 and 15 are diagrams for explaining a compensation circuit according to a fifth embodiment.

Referring to FIGS. 14 to 15, a compensation circuit according to a fifth embodiment may be configured to divide the display panel into a first area S1 and a second area S2 and to alternately apply the compensation circuits of the first embodiment and the second embodiment to each area.

For example, the compensation circuit in the first area may operate as the compensation circuit according to the first embodiment, and the compensation circuit in the second area may operate as the compensation circuit according to the second embodiment.

As shown in FIG. 15, a compensation circuit 600-5 according to the fifth embodiment may include a first gain compensator 610-5*a*, a second gain compensator 610-5*b*, a first voltage compensator 620-5, a second voltage compensator 630-5, a first switch element SW1, and a second switch element SW2.

A frame includes a first section T1 that compensates for the voltage drop of the pixel driving voltage in the first area S1, and a second section T2 that compensates for the voltage drop of the pixel driving voltage in the second area S2. The first section T1 and the second section T2 may be alternately driven every frame.

In the first section T1, the first switch element SW1 is turned on and the second switch element SW2 is turned off so that the first gain compensator 610-5*a* is connected to the first voltage compensator 620-5 and the second voltage compensator 630-5.

In the second section T2, the first switch element SW1 is turned off and the second switch element SW2 is turned on so that the second gain compensator 610-5*b* is connected to the first voltage compensator 620-5 and the second voltage compensator 630-5.

The structure and operation of the compensation circuit are the same as those described in the first and second embodiments.

Figure 16A:
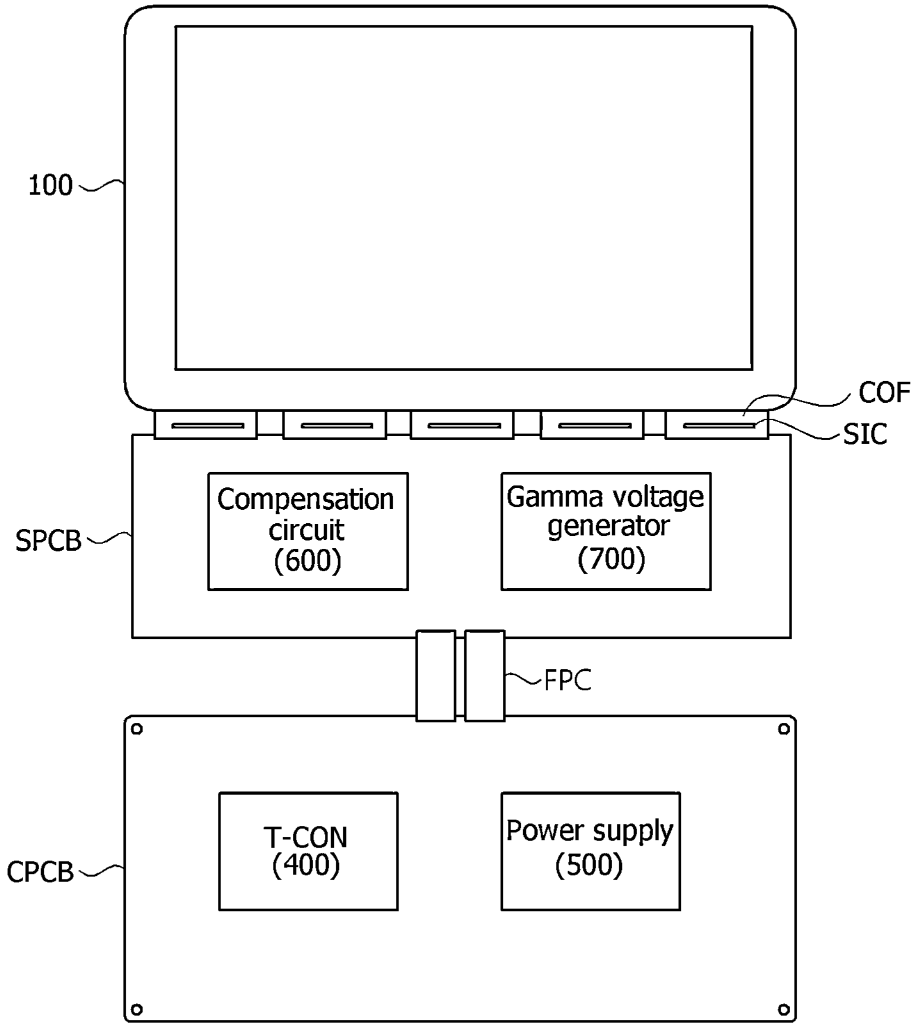
FIGS. 16A and 16B are diagrams illustrating an arrangement of a compensation circuit according to an embodiment.
Figure 16B:
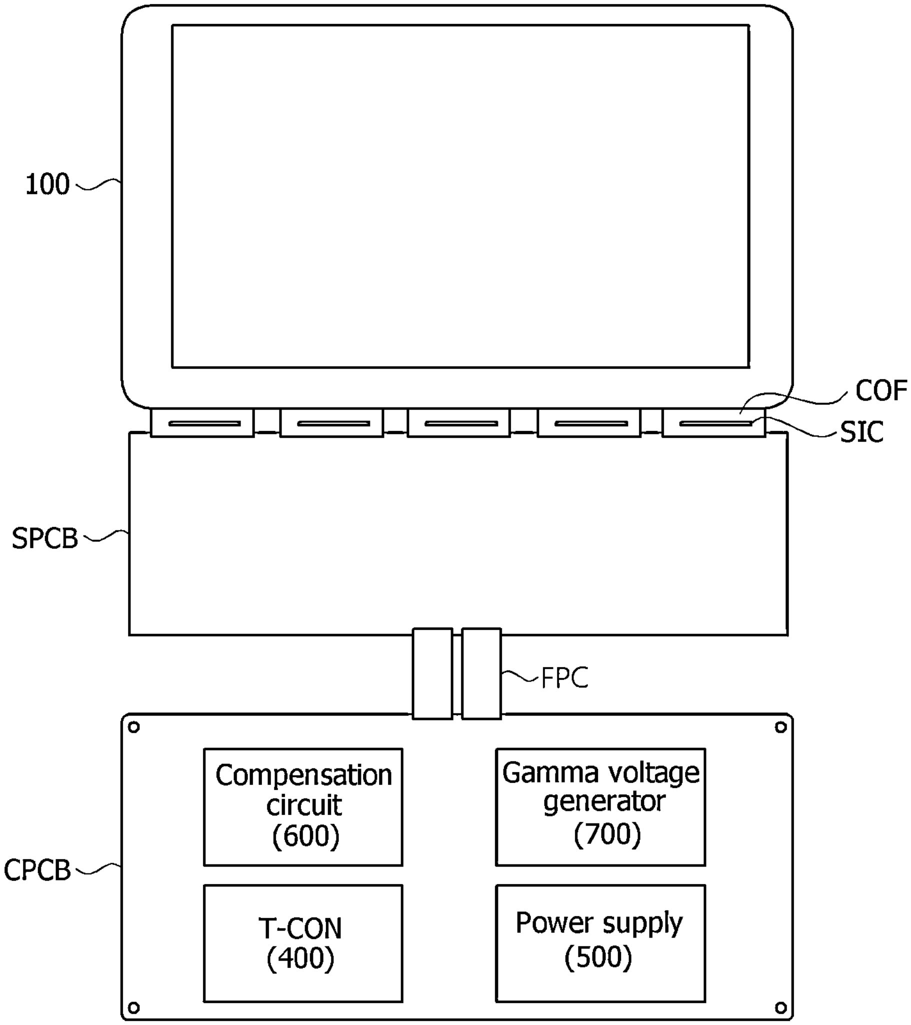

FIGS. 16A and 16B are diagrams illustrating an arrangement of a compensation circuit according to an embodiment.

Referring to FIG. 16A, the compensation circuit 600 and a gamma voltage generator 700 according to the embodiment may be mounted on a source printed circuit board SPCB. A timing controller 400 and the power supply 500 may be mounted on a control printed circuit board CPCB. The control printed circuit board CPCB may be connected to the source printed circuit board SPCB by a flexible circuit film, such as a flexible printed circuit FPC.

Referring to FIG. 16B, the compensation circuit 600, the gamma voltage generator 700, the timing controller 400 and the power supply 500 according to the embodiment may be mounted on a control printed circuit board CPCB.

A pixel driving voltage ELVDD output from the power supply 500 may be supplied to the display panel 100 via the flexible printed circuit FPC, the source printed circuit board SPCB, and a chip on film COF. A voltage wire on the display panel 100 may be connected to the power supply 500 via the chip on film COF, the source printed circuit board SPCB, and the flexible printed circuit FPC.

Figure 17:
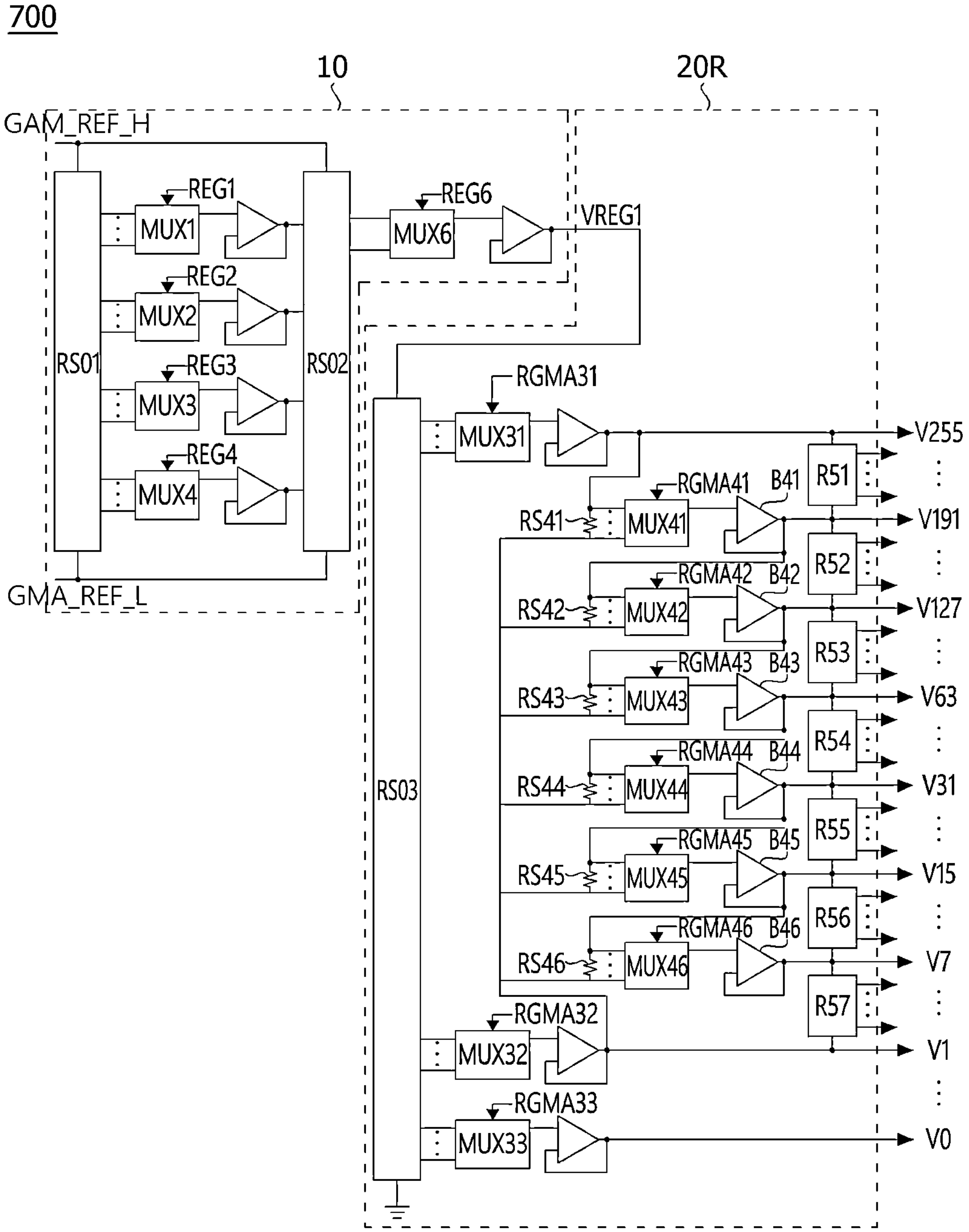
FIG. 17 is a circuit diagram illustrating an example of a gamma compensation voltage generator shown in FIG. 5.

FIG. 17 is a circuit diagram illustrating an example of a gamma compensation voltage generator shown in FIG. 5.

Referring to FIG. 17, a gamma voltage generator 700 includes a first divider circuit RS01, a first voltage selector, a second divider circuit RS02, a second voltage selector, a third divider circuit RS03, a third voltage selector, fourth voltage divider circuits RS41 to RS46, a fourth voltage selector, and fifth divider circuits R51 to R57.

The first voltage divider circuit RS01 distributes a high-potential gamma reference voltage GMA_REF_H using resistors connected in series between the high-potential gamma reference voltage GMA_REF_H and a low-potential gamma reference voltage GMA_REF_L to output voltages having different voltage levels.

The first voltage selector selects the voltage output from the first voltage divider circuit RS01. The first voltage selector includes first to fourth multiplexers MUX1 to MUX4 connected between the first divider circuit RS01 and the second divider circuit RS02 to supply the voltage selected from the first divider circuit RS01 to the second divider circuit RS02. The first to fourth multiplexers MUX1 to MUX4 output voltages that are lower than the high-potential gamma reference voltage GMA_REF_H and have different voltage levels, which are supplied to nodes of the second voltage divider circuit RS02. The voltages output from each of the first to fourth multiplexers MUX1 to MUX4 are directly applied through a buffer to nodes spaced at regular intervals in the second voltage divider circuit RS02. The first to fourth multiplexers MUX1 to MUX4 may adjust voltages set according to register settings REG1 to REG4.

The register settings REG1 to REG4, RGAMA31 to RGAMA33, and RGAMA41 to RGAMA46 may be stored in a first memory 210 prior to shipping of the product and then transferred to a second memory 132 when an electroluminescent display device is powered on, or may be stored in the second memory 132 prior to shipping of the product. The register settings REG1 to REG4 are register setting values for adjusting luminance during optical compensation or in conjunction with a display brightness value (DBV). The DBV may be varied in response to an illuminance sensor output signal from a host system or a luminance input value from a user.

The second voltage divider circuit RS02 includes resistors connected in series between a node to which the high-potential gamma reference voltage GMA_REF_H is applied and a node to which the low-potential gamma reference voltage GMA_REF_L is applied. The second voltage divider circuit RS02 divides the high-potential gamma reference voltage GMA_REF_H and outputs voltages of different voltage levels through the nodes between the resistors.

The second voltage selector may include a multiplexer MUX6 that selects a first reference voltage VREG1 by selecting one of the nodes of the second voltage divider circuit RS02 according to a register setting REG6. The output voltage of the multiplexer MUX6 may be varied depending on the register setting REG6. The first reference voltage VREG1 output from the multiplexer MUX6 is supplied through a buffer to a third voltage divider circuit RS03.

The third voltage divider circuit RS03 divides the first reference voltage VREG1 using resistors connected in series between the first reference voltage VREG1 and a ground GND to output voltages having different voltage levels.

The third voltage selector includes a third-first multiplexer MUX31 that selects any one of high potential nodes of the third voltage divider circuit RS03 according to a register setting RGMA31 and outputs a high potential gamma reference voltage from the selected node as the highest gamma compensation voltage V255, a third-second multiplexer MUX32 that selects any one of low potential nodes of a first group in the third voltage divider circuit RS03 according to a register setting RGMA32 and outputs a low potential voltage from the selected node as a seventh gamma tap voltage V1, and a third-third multiplexer MUX33 that selects any one of low potential nodes of a second group in the third voltage divider circuit RS03 according to a register setting RGMA33 and outputs the lowest gamma compensation voltage V0 from the selected node.

The fourth voltage divider circuits RS41 to RS46 include fourth-first to fourth-sixth voltage divider circuits RS41 to RS46 that divide voltages between the highest gamma compensation voltage V255 and the seventh gamma tap voltage V1 to output gamma compensation voltages for each gray level.

The fourth voltage selector includes fourth-first to fourth-sixth voltage selectors that output the first to sixth gamma tap voltages V255, V191, . . . , V7 using multiplexers MUX41 to MUX46. The first to sixth gamma tap voltages V255, V191, . . . , V7 are lower than the highest gamma compensation voltage V255 and higher than the seventh gamma tap voltage V1.

The fourth-first voltage divider circuit RS41 divides the highest gamma compensation voltage V255 using resistors connected in series between the highest gamma compensation voltage V255 and the seventh gamma tap voltage V1. The fourth-first voltage selector includes a fourth-first multiplexer MUX41 that selects one of the nodes of the fourth-first voltage divider circuit RS41. The fourth-first multiplexer MUX41 selects one of the nodes of the fourth-first 1 voltage divider circuit RS41 depending on the register setting RGMA41 to output the voltage from the selected node.

The output voltage of the fourth-first multiplexer MUX41 is output as the first gamma tap voltage V191 via the buffer B41. The first gamma tap voltage V191 is a gamma compensation voltage corresponding to a grayscale value 191 of the pixel data RGB.

The fourth-second voltage divider circuit RS42 divides the first gamma tap voltage V191 using resistors connected in series between the first gamma tap voltage V191 and the seventh gamma tap voltage V1. The fourth-second multiplexer MUX42 selects one of the nodes of the fourth-second voltage divider circuit RS42 depending on the register setting RGMA42 to output the voltage from the selected node. The output voltage of the fourth-second multiplexer MUX42 is output as the second gamma tap voltage V127 via the buffer B42. The second gamma tap voltage V127 is a gamma compensation voltage corresponding to the grayscale value 127 of the pixel data RGB.

The fourth-sixth voltage divider circuit RS46 divides the fifth gamma tap voltage V15 using resistors connected in series between the fifth gamma tap voltage V15 and the seventh gamma tap voltage V1. The fourth-sixth multiplexer MUX46 selects one of the nodes of the fourth-sixth voltage divider circuit RS46 depending on the register setting RGMA46 to output the voltage from the selected node. The output voltage of the fourth-sixth multiplexer MUX46 is output as the sixth gamma tap voltage V7 via the buffer B46. The sixth gamma tap voltage V7 is a gamma compensation voltage corresponding to the grayscale value 7 of the pixel data RGB.

The fifth voltage divider circuit R51 to R57 uses the resistors connected in series between the highest gamma compensation voltage V255 and the seventh gamma tap voltage V1 to distribute the highest gamma compensation voltage V255 so that the gamma compensation voltages V1 to V255 are output for each gray level having different voltage levels. The fifth-first voltage divider circuit R51 uses resistors connected in series between the highest gamma compensation voltage V255 and the first gamma tap voltage V191 so that the gamma compensation voltages between the highest gamma compensation voltage V255 and the first gamma tap voltage V191 are output for each gray level. The fifth-second voltage divider circuit R52 uses resistors connected in series between the first gamma tap voltage V191 and the second gamma tap voltage V127 so that the gamma compensation voltages between the first gamma tap voltage V191 and the second gamma tap voltage V127 are output for each gray level. The fifth-sixth voltage divider circuit R56 uses resistors connected in series between the fifth gamma tap voltage V15 and the sixth gamma tap voltage V7 so that the gamma compensation voltages between the fifth gamma tap voltage V15 and the sixth gamma tap voltage V7 are output for each gray level. The fifth-seventh voltage divider circuit R57 uses resistors connected in series between the sixth gamma tap voltage V7 and the seventh gamma tap voltage V1 so that the gamma compensation voltages between the sixth gamma tap voltage V7 and the seventh gamma tap voltage V1 are output for each gray level. The gamma compensation voltages V0 to V255 are supplied to the DAC of the data driving unit 200.

The gamma compensation voltage of the data voltage may be implemented as positive gamma or negative gamma depending on the pixel circuit structure. For example, when a light-emitting device of pixels, such as a transistor driving an OLED, is implemented as an n-channel MOSFET and a data voltage is applied to the gate of the transistor, a gamma compensation voltage with a positive gamma is generated, and the higher the gray level of the pixel data (RGB), the higher the gamma compensation voltage.

FIG. 17 illustrates a gamma voltage generator set to a positive gamma. When a light-emitting device of pixels is implemented as a p-channel MOSFET and a data voltage is applied to the gate of the transistor, a gamma compensation voltage with a negative gamma is generated, and the higher the gray level of the pixel data (RGB), the lower the gamma compensation voltage. In this case, in FIG. 17, the voltage levels of GMA_REF_H and GMA_REF_L are changed to each other, and the voltage levels of VREG1 and VREG2 are also changed to each other.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure.

What is claimed is:

1. A compensation circuit comprising:

a gain compensator circuit configured to calculate a voltage drop amount of a first pixel driving voltage that is output from a power supply onto a wire connected to the power supply and a display panel using the first pixel driving voltage output and a second pixel driving voltage fed back from the wire, the calculated voltage drop amount amplified by a gain value;

a first voltage compensator configured to generate a high-potential gamma reference voltage by adjusting a first reference voltage using the calculated voltage drop amount; and a second voltage compensator configured to generate a low potential gamma reference voltage that is less than the high-potential gamma reference voltage by adjusting a second reference voltage using the calculated voltage drop amount, wherein the gain compensator circuit is configured to calculate the gain value using a first voltage at a first point of the wire and a second voltage at a second point of the wire that is spaced apart from the first point on the wire, wherein the gain compensator circuit includes a first operational amplifier amplifying the calculated voltage drop amount with the gain value, wherein the first voltage compensator includes:

a second operational amplifier including an inverting input terminal, a non-inverting input terminal, and an output terminal;

a first-1 resistor connected to the inverting input terminal of the second operational amplifier and a ground;

a second-1 resistor connected to the output terminal and the inverting input terminal of the second operational amplifier;

a third-1 resistor connected to the non-inverting input terminal of the second operational amplifier, the third resistor receiving a voltage output from the output terminal of the first operational amplifier; and a fourth-1 resistor connected to the non-inverting input terminal of the second operational amplifier, the fourth resistor receiving a first reference voltage.

2. The compensation circuit of claim 1, wherein the first point is a position where the second pixel driving voltage is fed back from an input end of the display panel and the second point is a position on the wire for calculating the voltage drop amount of the second pixel driving voltage that is fed back.

3. The compensation circuit of claim 2, wherein the gain value varies depending on the position of the first point and the position of the second point.

4. The compensation circuit of claim 3, wherein the first point is located closer to the power supply than the second point, and the gain compensator circuit includes:

a first resistor that receives the first pixel driving voltage output from the power supply;

the first operational amplifier including an inverting input terminal that is connected to the first resistor, a non-inverting input terminal that receives the second pixel driving voltage, and an output terminal; and a second resistor connected to the output terminal and the inverting input terminal.

5. The compensation circuit of claim 3, wherein the second point is located closer to the power supply than the first point, and the gain compensator circuit includes:

a first resistor that receives the first pixel driving voltage is applied;

a second resistor that receives the second pixel driving voltage; and the first operational amplifier including an inverting input terminal, a non-inverting input terminal that is connected to the first resistor and the second resistor, and an output terminal connected to the inverting input terminal.

6. The compensation circuit of claim 1, wherein the second voltage compensator includes:

a third operational amplifier including an inverting input terminal, a non-inverting input terminal, and an output terminal;

a first resistor connected to the inverting input terminal of the third operational amplifier and the ground;

a second resistor connected to the output terminal of the third operational amplifier and the inverting input terminal;

a third resistor connected to the non-inverting input terminal of the third operational amplifier, the third resistor receiving the voltage output from the output terminal of the first operational amplifier; and a fourth resistor connected to a non-inverting input terminal of the third operational amplifier, the fourth resistor receiving the second reference voltage.

7. A compensation circuit comprising:

a gain compensator circuit configured to calculate a voltage drop amount of a first pixel driving voltage that is output from a power supply onto a wire connected to the power supply and a display panel using the first pixel driving voltage output and a second pixel driving voltage fed back from the wire, the calculated voltage drop amount amplified by a gain value;

a first voltage compensator configured to generate a high-potential gamma reference voltage by adjusting a first reference voltage using the calculated voltage drop amount; and a second voltage compensator configured to generate a low potential gamma reference voltage that is less than the high-potential gamma reference voltage by adjusting a second reference voltage using the calculated voltage drop amount, wherein the gain compensator circuit is configured to calculate the gain value using a first voltage at a first point of the wire and a second voltage at a second point of the wire that is spaced apart from the first point on the wire, wherein the display panel includes a first area and a second area, and the gain compensator circuit includes:

a first gain compensator configured to generate a voltage drop amount in the first area by amplifying the voltage drop amount in the first area by a first gain value;

a first switch element configured to connect the first gain compensator to the first voltage compensator and the second voltage compensator responsive to a first control signal;

a second gain compensator configured to generate a voltage drop amount in the second area by amplifying the voltage drop amount in the second area by a second gain value; and a second switch element configured to connect the second gain compensator to the first voltage compensator and the second voltage compensator responsive to a second control signal, and wherein the first switch element is turned on while the second switch element is turned off and the first switch element is turned on while the second switch element is turned on.

8. The compensation circuit of claim 7, wherein the first control signal and the second control signal are received from a timing controller.

9. A display device comprising:

a display panel including a plurality of data lines, a plurality of gate lines, and pixels supplied with a first pixel driving voltage;

a data driving circuit configured to supply pixel data to the plurality of data lines;

a power supply configured to output the first pixel driving voltage;

a wire that is connected to the power supply and the display panel, the first pixel driving voltage supplied on the wire; and a compensation circuit configured to calculate a voltage drop amount of the first pixel driving voltage using a first voltage at a first point on the wire and a second voltage at a second point on the wire that is different from the from the first point, wherein the calculated voltage drop amount is amplified by the compensation circuit using a gain value that matches the second voltage at the second point, wherein the compensation circuit comprises:

a gain compensator circuit configured to generate the voltage drop amount using the first pixel driving voltage that is output from the power supply and a second pixel driving voltage fed back from the wire of the display panel;

a first voltage compensator configured to generate a high potential gamma reference voltage by adjusting a first reference voltage using the voltage drop amount; and a second voltage compensator configured to generate a low potential gamma reference voltage by adjusting a second reference voltage using the voltage drop amount, wherein the gain compensator circuit includes a first operational amplifier amplifying the calculated voltage drop amount with the gain value, wherein the first voltage compensator includes:

a second operational amplifier including an inverting input terminal, a non-inverting input terminal, and an output terminal;

a first-1 resistor connected to the inverting input terminal of the second operational amplifier and a ground;

a second-1 resistor connected to the output terminal and the inverting input terminal of the second operational amplifier;

a third-1 resistor connected to the non-inverting input terminal of the second operational amplifier, the third resistor receiving a voltage output from the output terminal of the first operational amplifier; and a fourth-1 resistor connected to the non-inverting input terminal of the second operational amplifier, the fourth resistor receiving a first reference voltage.

10. The display device of claim 9, wherein the first pixel driving voltage is fed back at the first point and the second point is a position at which a voltage drop amount of the second pixel driving voltage is fed back.

11. The display device of claim 10, wherein the gain value varies depending on positions of the first point and the second point.

12. The display device of claim 11, wherein the first point is located closer to the power supply than the second point and the second point is within the display panel and before pixels in the display panel, and the gain compensator circuit includes:

a first resistor that receives the first pixel driving voltage output from the power supply;

the first operational amplifier including an inverting input terminal that is connected to the first resistor, a non-inverting input terminal that receives the second pixel driving voltage, and an output terminal; and a second resistor connected to the output terminal and the inverting input terminal.

13. The display device of claim 11, wherein the second point is located closer to the power supply than the first point and the first point is a position in the display panel after the pixels, and the gain compensator circuit includes:

a first resistor that receives the first pixel driving voltage;

a second resistor that receives the second pixel driving voltage; and the first operational amplifier including an inverting input terminal, a non-inverting input terminal that is connected to the first resistor and the second resistor, and an output terminal connected to the inverting input terminal.

14. The display device of claim 13, wherein the first voltage compensator includes:

a second operational amplifier including an inverting input terminal, a non-inverting input terminal, and an output terminal;

a first resistor connected to the inverting input terminal of the second operational amplifier and a ground;

a second resistor connected to an output terminal and the inverting input terminal of the second operational amplifier;

a third resistor connected to the non-inverting input terminal of the second operational amplifier, the third resistor receiving a voltage output from the first operational amplifier; and a fourth resistor connected to the non-inverting input terminal of the second operational amplifier, the fourth resistor receiving the first reference voltage;

wherein the second voltage compensator includes:

a third operational amplifier including an inverting input terminal, a non-inverting input terminal, and an output terminal;

a first resistor connected to the inverting input terminal of the third operational amplifier and the ground;

a second resistor connected to an output terminal of the third operational amplifier and the inverting input terminal;

a third resistor connected to the non-inverting input terminal of the third operational amplifier, the third resistor receiving the voltage output from the first operational amplifier; and a fourth resistor connected to a non-inverting input terminal of the third operational amplifier, the fourth resistor receiving the second reference voltage.

15. The display device of claim 9, wherein the second voltage compensator includes:

a third operational amplifier including an inverting input terminal, a non-inverting input terminal, and an output terminal;

a first resistor connected to the inverting input terminal of the third operational amplifier and the ground;

a second resistor connected to an output terminal of the third operational amplifier and the inverting input terminal;

a third resistor connected to the non-inverting input terminal of the third operational amplifier, the third resistor receiving the voltage output from the first operational amplifier; and a fourth resistor connected to a non-inverting input terminal of the third operational amplifier, the fourth resistor receiving the second reference voltage.

16. A display device comprising:

a display panel including a plurality of data lines, a plurality of gate lines, and pixels supplied with a first pixel driving voltage;

a data driving circuit configured to supply pixel data to the plurality of data lines;

a power supply configured to output the first pixel driving voltage;

a wire that is connected to the power supply and the display panel, the first pixel driving voltage supplied on the wire; and a compensation circuit configured to calculate a voltage drop amount of the first pixel driving voltage using a first voltage at a first point on the wire and a second voltage at a second point on the wire that is different from the from the first point, wherein the calculated voltage drop amount is amplified by the compensation circuit using a gain value that matches the second voltage at the second point, wherein the compensation circuit comprises:

a gain compensator circuit configured to generate the voltage drop amount using the first pixel driving voltage that is output from the power supply and a second pixel driving voltage fed back from the wire of the display panel;

a first voltage compensator configured to generate a high potential gamma reference voltage by adjusting a first reference voltage using the voltage drop amount; and a second voltage compensator configured to generate a low potential gamma reference voltage by adjusting a second reference voltage using the voltage drop amount, wherein the display panel includes a first area and a second area, the gain compensator circuit includes:

a first gain compensator configured to generate a voltage drop amount in the first area by amplifying the voltage drop amount in the first area by a first gain value;

a first switch element configured to connect the first gain compensator to the first voltage compensator and the second voltage compensator responsive to a first control signal;

a second gain compensator configured to generate a voltage drop amount in the second area by amplifying the voltage drop amount in the second area by a second gain value; and a second switch element configured to connect the second gain compensator to the first voltage compensator and the second voltage compensator responsive to a second control signal, and wherein the first switch element is turned on while the second switch element is turned off and the first switch element is turned on while the second switch element is turned on.

17. The display device of claim 16, further comprising:

a timing controller configured to output the first control signal and the second control signal.

* * * * *